(12) United States Patent
Hankey et al.

(10) Patent No.: US 11,885,994 B2
(45) Date of Patent: Jan. 30, 2024

(54) DICHROIC GLASS FOR COSMETIC APPEAL IN AN ELECTRONIC DEVICE

(71) Applicant: Apple Inc., Cupertino, CA (US)

(72) Inventors: Evans Hankey, San Francisco, CA (US); Ron Moller, Los Gatos, CA (US); Jody Akana, San Francisco, CA (US); Mike Pilliod, Venice, CA (US); Michael Holmberg, Cupertino, CA (US); Peter Russell-Clarke, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 538 days.

(21) Appl. No.: 15/617,825

(22) Filed: Jun. 8, 2017

(65) Prior Publication Data

US 2017/0307795 A1 Oct. 26, 2017

Related U.S. Application Data

(63) Continuation of application No. 12/971,963, filed on Dec. 17, 2010, now Pat. No. 9,678,258.

(Continued)

(51) Int. Cl.
*G02B 5/26* (2006.01)
*G02B 5/28* (2006.01)
*H04M 1/02* (2006.01)

(52) U.S. Cl.
CPC ............... *G02B 5/26* (2013.01); *G02B 5/286* (2013.01); *H04M 1/0283* (2013.01);
(Continued)

(58) Field of Classification Search
CPC ..... Y10T 428/24802; Y10T 428/24851; Y10T 428/24926; G02B 5/201; G02B 5/26;
(Continued)

(56) References Cited

U.S. PATENT DOCUMENTS 6,158,156 A 12/2000 Patrick
6,249,378 B1 * 6/2001 Shimamura .......... G02B 5/0825
353/20

(Continued)

FOREIGN PATENT DOCUMENTS

CN 101396884 4/2009
EP 1607796 12/2005
(Continued)

*Primary Examiner* — Maria V Ewald
(74) *Attorney, Agent, or Firm* — Brownstein Hyatt Farber Schreck, LLP

(57) ABSTRACT

A dichroic coating can be applied to a glass window of an electronic device to enhance the cosmetic and aesthetic appeal of the device. Different processes can be applied to the glass window in combination with a dichroic coating. For example, a layer of ink can be applied to the glass window in addition to one or more layers of dichroic material. The material layers can cover any suitable portion of the glass. For example, the material layers can include holes or openings. As another example, the material layers can be constructed from several distinct shapes placed on the glass. In some cases, software applications can be used to define a desired color profile for a coating, and to retrieve a suitable combination of dichroic and other layers to provide the desired color profile.

20 Claims, 13 Drawing Sheets

Related U.S. Application Data

(60) Provisional application No. 61/310,416, filed on Mar. 4, 2010, provisional application No. 61/287,422, filed on Dec. 17, 2009.

(52) U.S. Cl.
CPC ............... *Y10T 428/24752* (2015.01); *Y10T 428/24868* (2015.01); *Y10T 428/24926* (2015.01)

(58) Field of Classification Search
CPC . G02B 5/28; G02B 5/285; G02B 5/22; G02B 5/223; G02B 1/10; B32B 3/10; B32B 3/18; B32B 17/06; B32B 2307/41
See application file for complete search history.

(56) References Cited

U.S. PATENT DOCUMENTS

| | | |
|---|---|---|
| 6,275,273 B1 | 8/2001 | Inoue |
| 6,407,783 B1 | 6/2002 | Ohgawara et al. |
| 6,417,899 B1 | 7/2002 | Jones et al. |
| 7,121,669 B2 * | 10/2006 | Lisaka ................... G02B 5/201 |
| | | 353/84 |
| 2001/0040001 A1 * | 11/2001 | Toyooka ................. B29C 43/40 |
| | | 156/233 |
| 2001/0040716 A1 | 11/2001 | Itoh et al. |
| 2005/0079333 A1 | 4/2005 | Wheatley et al. |
| 2006/0007373 A1 | 1/2006 | Arai et al. |
| 2006/0013991 A1 | 1/2006 | Kuepper et al. |
| 2008/0239497 A1 * | 10/2008 | Lippey ................... G02B 5/285 |
| | | 359/614 |
| 2009/0040703 A1 * | 2/2009 | Gotham ................... H05K 5/02 |
| | | 361/679.02 |
| 2009/0265969 A1 | 10/2009 | Nezu |

FOREIGN PATENT DOCUMENTS

| | | |
|---|---|---|
| EP | 1616975 | 1/2006 |
| JP | H60134203 | 7/1985 |
| JP | 2005049725 | 2/2005 |
| JP | 2007094165 | 4/2007 |
| JP | 2009078458 | 4/2009 |
| JP | 20090265407 | 11/2009 |
| WO | WO 2000/027545 | 5/2000 |
| WO | WO 02/084343 | 10/2002 |
| WO | WO 02/095456 | 11/2002 |
| WO | WO 2007/095171 | 8/2007 |
| WO | WO 2007/115040 | 10/2007 |
| WO | WO 2009/094043 | 7/2009 |

* cited by examiner

DICHROIC GLASS FOR COSMETIC APPEAL IN AN ELECTRONIC DEVICE

CROSS-REFERENCE TO RELATED APPLICATIONS

This application is a continuation patent application of U.S. patent application Ser. No. 12/971,963, filed Dec. 17, 2010 and titled "Dichroic Glass for Cosmetic Appeal in an Electronic Device," which claims the benefit of previously filed U.S. Provisional Patent Application No. 61/287,422, filed Dec. 17, 2009 and titled "Dichroic Glass for Cosmetic Appeal in an Electronic Device," and of U.S. Provisional Patent Application No. 61/310,416, filed Mar. 4, 2010 and titled "Dichroic Glass for Cosmetic Appeal in an Electronic Device," the disclosures of which are hereby incorporated herein by reference in their entireties.

BACKGROUND OF THE INVENTION

The cosmetic effect of surface treatments applied to products having optical components can be of great importance. In consumer product industries, such as the electronics industry, visual aesthetics may be a deciding factor in a consumer's decision to purchase one product over another. Accordingly, there is a continuing need for new surface treatments, or combinations of surface treatments, for optical surfaces to create products with new and different visual appearances or cosmetic effects.

SUMMARY OF THE INVENTION

Systems and methods are provided for coating a glass component of an electronic device with several coatings to provide the glass component with dichroic optical properties. In particular, different materials can be coated in different quantities and locations on a glass component to provide an aesthetically pleasing glass component, such as a window of an electronic device.

To enhance the aesthetic appearance of the electronic device, it may be desirable to apply different processes to a glass component to provide an aesthetically pleasing color coating. For example, different materials can be provided on a glass window of a device in thin films to create colored glass surfaces. As another example, coatings can be applied to a glass component such that the component is highly reflective when the display is turned off, but becomes transparent when the display is turned on. As still another example, coatings can be applied in a manner that allows logos or other watermarks to appear on the component. In some embodiments, a dichroic coating can be used to provide these color-based aesthetic effects.

Any suitable material can be applied to a component in one or more layers and in different thicknesses and orders to provide a desired aesthetic effect. For example, different material layers can be selected to match a particular desired color profile, hue, saturation, color gradient, or other visual property. As another example, the opacity or other optical properties of each layer or stack of layers (e.g., a stack of dichroic layers, or a stack of physical vapor deposition (PVD) layers) can vary. In some embodiments, different types of layers or material stacks can be combined with dichroic layers to provide particular aesthetic affects. In one implementation, the component can include an ink stack beneath the dichroic stack to control the manner in which light is reflected and transmitted through the dichroic layer.

The material of each layer or stack can be provided over any suitable portion of the surface. For example, each layer of a dichroic stack can include holes or distinct shapes that cover a portion of a component. In one implementation, each layer can be provided as a set of shapes covering an amount in the range of 50% to 75% of a region of the component. The layer can be provided using different approaches. For example, the several distinct shapes can be deposited to form the layer. As another example, a mask can be used to remove portions of a deposited layer.

The particular material and layer configuration for generating the dichroic stack can be selected using any suitable approach. In some embodiments, software can be used to define the material and layer configuration. For example, software can be provided with a desired color power curve defining the amount of light to be transmitted, reflected, or both at a particular angle at each wavelength. From the defined color power curve, the software can calculate the most appropriate combination of materials and layers that, once applied to the glass surface, will provide the defined color power curve. In one implementation, the materials used can include a combination of $TiO_2$ and $SiO_2$.

BRIEF DESCRIPTION OF THE DRAWINGS

The above and other features of the present invention, its nature and various advantages will be more apparent upon consideration of the following detailed description, taken in conjunction with the accompanying drawings in which.

DETAILED DESCRIPTION

The detailed description below relates to different treatments for a surface of an article, and more particularly to cosmetic treatments directed at electronic device components that have optical properties. The components can include, for example, glass elements such as cover windows and cosmetic glass used in electronic devices. The treatments can include coatings or other processes by which material is deposited on a surface, processes for embedding materials within a device component (e.g., embedding particular materials in a glass window), removing material from a device component (e.g., polishing a window), or other treatments of optical components. Although portions of the following discussion will describe the treatments in the context of a glass window, it will be understood that the treatments can be applied to any transparent or translucent surface of an electronic device, such as glass or plastic windows. For example, the treatments can be applied to a glass plate having two opposite and co-planar surfaces on which treatments can be applied.

In some embodiments, one or more treatments can be combined to provide a particular desired cosmetic effect. For example, one or more coatings can be applied to an optical component (e.g., cover window). The properties of the one or more coatings can be selected to produce an aesthetically unique and pleasing finish that can enhance a product's appeal. In particular, the properties of each of the coatings can combine (e.g., the coatings can stack such that the interplay between the stacks provides a particular effect) to provide an aesthetically pleasing effect. By way of example, one or more translucent, semi transparent, and opaque coatings may be applied to produce the desired cosmetic effect. As another example, at least one of the coatings can be a dichroic coating. In one implementation, a cover window can include at least a dichroic stack over an ink stack.

A dichroic material causes visible light to be split up into distinct beams of different colors (i.e., transmitted light and reflected light). In particular, a dichroic finish can be applied to a cover window such that the cover window appears in vibrant colors to a user (e.g., a sparkling effect, a rich color, and/or a glossy or shiny appearance).

Figure 1:
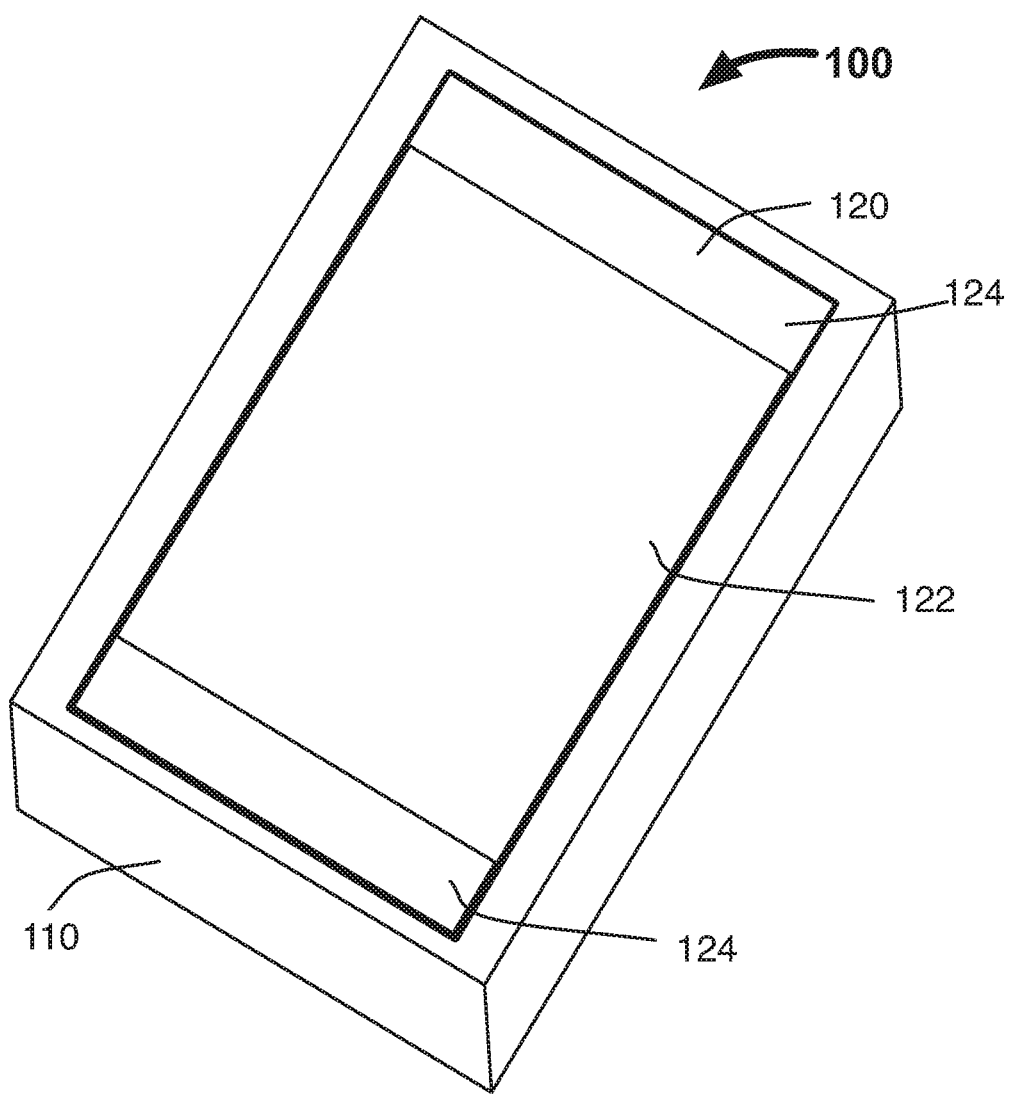
FIG. 1 is a schematic view of an illustrative electronic device in accordance with some embodiments of the invention.

Embodiments of the invention are discussed below with reference to FIGS. 1-15. However, those skilled in the art will readily appreciate that the detailed description given herein with respect to these figures is for explanatory purposes as the invention extends beyond these limited embodiment. FIG. 1 is a schematic view of an electronic device in accordance with some embodiments of the invention. Electronic device 100 can include housing 110 and window 120, such that window 120 is secured to housing 110. Housing 110 can be constructed from any suitable material including, for example, plastic, metal, or a composite material. Window 120 can be constructed from any suitable transparent or translucent material including, for example, glass or plastic. Window 120 can be coupled to housing 110 using any suitable approach including, for example, using a support plate that is in contact with some or all of the window (e.g., only a periphery of the window). In some cases, a glass element can instead or in addition be coupled to housing 110 (e.g., a plate of the housing) to provide a cosmetic surface. Although the following discussion will describe different embodiments in the context of a glass window, it will be understood that other transparent or translucent materials can be used instead of or in addition to glass.

Window 120 can be positioned at least over display circuitry of electronic device 100. In some embodiments, window 120 can extend beyond the periphery of the display circuitry. In the example of device 100, window 120 can cover display area 122 and masked areas 124. Masked areas can include a dark mask or other element coupled to the window to hide components of the device from view (e.g., wires, circuits and other components that are connected to the display circuitry). The mask can be formed in any suitable manner including, for example, by placing a coat of opaque material on the inner surface of the window in masked areas 124.

To enhance the aesthetic appearance of window 120, one or more optical treatments can be applied to the window using any suitable process to provide an aesthetically pleasing finish that enhances a product's appeal. For example, one or more coatings can be applied to one or more surfaces of the window (e.g., to the interior surface of the window or to the exterior surface of the window). The coatings can have any suitable property. For example, the coatings can have varying thickness, opacity, colors, reflectivity, or other optical properties. As another example, one or more materials can be embedded within the window material to provide different optical effects (e.g., add different minerals in glass to change the opacity). As still another example, one or more processes can be applied to an exterior surface of the window to change the smoothness of the surface (e.g., etch or roughen the window surface to produce different light scattering effects).

One or more types of surface treatments can be combined to provide a particular cosmetic effect. For example, a window can include one or more coatings combined with a process modifying the exterior surface of the window. In one implementation, the surface treatment can include at least one dichroic coating layer combined with an opaque or reflective layer (e.g., ink) or stack of layers. For example, a dichroic stack can be combined with a dark opaque layer to absorb the transmitted portion of light passing through the dichroic layer and leaving only the reflected portion of the light visible. As another example, a dichroic layer can be combined with a light opaque layer so that both the transmitted light and the reflected light can be visible to the user. The particular color and opacity of the opaque layer and the configuration of the dichroic layer can be selected based on a desired a deep and pleasing hue (e.g., a hue ranging from pink from straight on and more orange from an angle).

Figure 2:
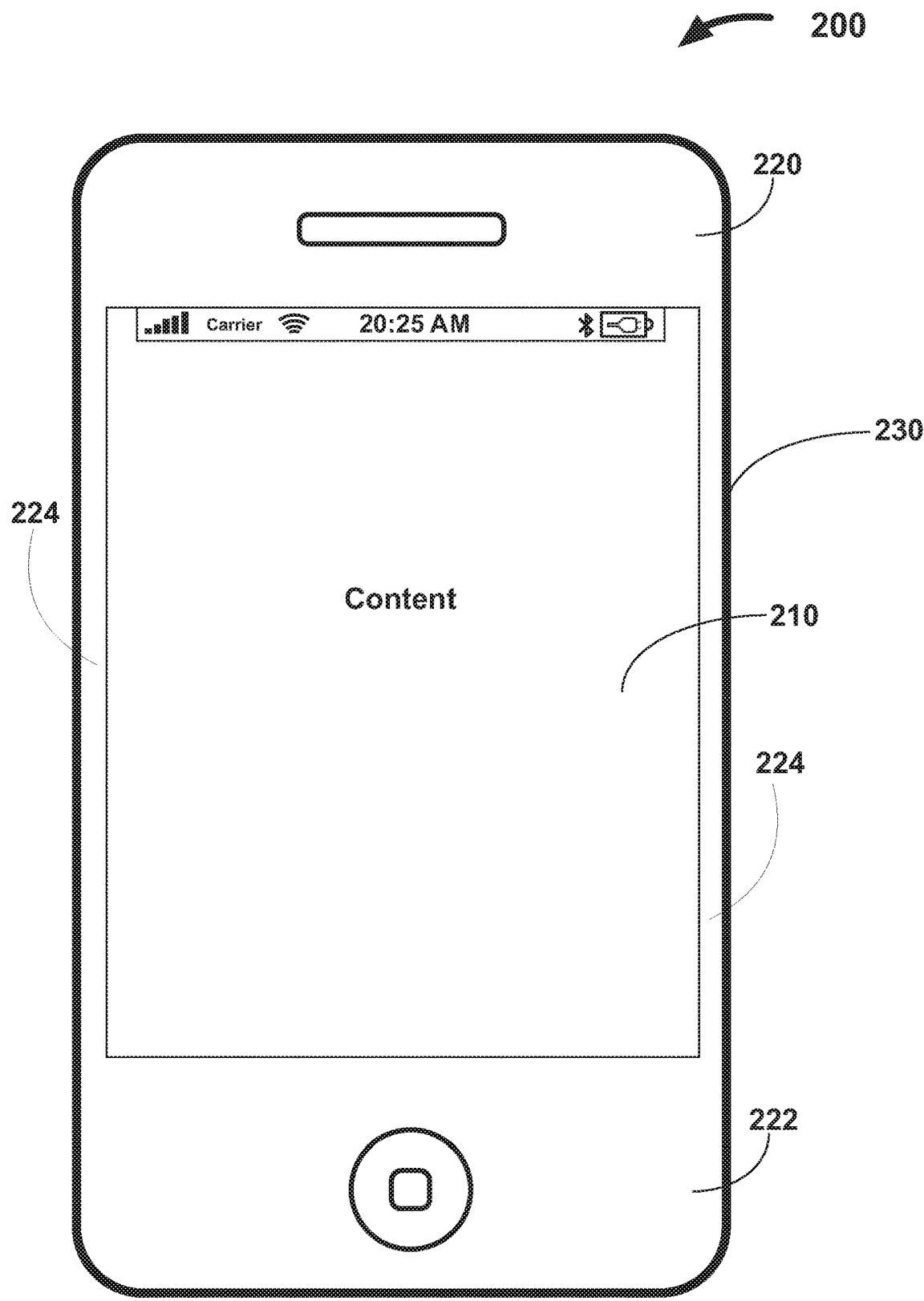
FIG. 2 is a schematic view of an illustrative glass surface used in an electronic device in accordance with some embodiments of the invention.

FIG. 2 is a schematic view of an illustrative window used in an electronic device in accordance with some embodiments of the invention. Window 200 can, in some embodiments, generally correspond to window 120 (FIG. 1). Window 200 can include several regions defined from the position of display circuitry underneath window 200 (e.g., based on the portions of window 200 through which light is to pass through). In the example of FIG. 2, window 200 can include display area 210 through which content is displayed, upper mask area 220 located above display area 210, lower mask area 222 located below display area 210, and side mask areas 224 located along the edges of display area 210.

A dichroic coating can be applied to a surface of one or more of the areas of window 200 using any suitable approach. In some cases, a dichroic coating can be provided by applying several thin layers of different metals (e.g., gold or silver) or metal oxides (e.g., titanium, chromium, aluminium, zirconium or magnesium) to the surface. For example, a dichroic coating can be applied by depositing a number of thin layers of $SiO_2$ and $TiO_2$ (e.g., 10 to 70 layers, 20 to 60 layers, 30 to 50 layers, or 20 layers) on the surface of the window to form a dichroic stack. The thin layers can be applied using any suitable approach including, for example, physical vapor deposition (PVD) processes.

The particular optical effects achieved can be determined or defined by the number of layers deposited, the type of material deposited in each layer, and the location or pattern of each layer on the material. In particular, each combination of a material and a layer thickness can be associated with a particular color or effect when light reflects from the surface through the dichroic coating. In some embodiments, materials and layers can be applied instead or in addition to dichroic layers to provide other optical effects. To define particular shapes or logos within the coating, one or more masks can be used for different layers of the coating.

In some embodiments, a dichroic stack can be combined with an opaque stack or layer (e.g., an ink stack or an ink layer) to control the manner in which light that is reflected by and transmitted through the dichroic stack appears to the user. For example, a dichroic stack can be combined with a dark ink stack (e.g., a black ink mask) to absorb the transmitted portion of light passing through the dichroic stack and leaving only the reflected portion of the light visible. As another example, a dichroic stack can be combined with a light ink stack (e.g., a white ink mask) so that both the transmitted light and the reflected light can be visible to the user. As still another example, a dichroic stack can be combined with a colored ink stack such that particular segments of the transmitted light and reflected light can be absorbed, while other segments can remain visible to the user. In some cases, the particular color of the ink stack and the configuration of the dichroic stack can be selected based on one or more desired resulting color power curves (described below). The colored opaque stack and the dichroic stack can have similar or different colors such that the resulting color visible to the user has an enhanced optical effect (e.g., color mixing). In particular, the ink and dichroic stacks can be selected to provide a rich and pleasing hue (e.g., a hue ranging from pink from straight on and more orange from an angle).

The coatings applied to the glass can be selected to provide any suitable cosmetic aspect. In some embodiments, the coatings can be selected such that the glass may appear to a user in a first color when viewed from a first angle (e.g., straight on) and in a second color when viewed from a second angle (e.g., from the side). In some embodiments, the coatings can be selected such that the opacity of the glass varies based on the angle from which the user is viewing the glass. In some embodiments, the coatings can be selected such that the reflectivity of the glass varies based on the viewing angle or based on the presence or absence of a backlight (e.g., the glass is highly reflective when the screen is off, but transparent or highly translucent when the screen is on). Alternatively, the coatings can be selected such that the glass blends in or matches with the housing or bezel colors (e.g., a highly reflective glass matching a reflective bezel, or a colored glass matching a colored aluminum housing). The coatings, however, can be selected such that they appear to disappear when the device screen is on and the user is manipulating the device (e.g., the coating effect is eliminated or reduced when light is emitted from the display through the back surface of the glass and coating). In some embodiments, other mirroring or light scattering finishes can be provided.

In some embodiments, a coating can be applied to portions of glass through which internal components of the device can receive light or transmit light. For example, a coating can be applied over a camera window. The coating can be selected to obscure the camera window for all light coming through the camera window from a predetermined angle or a range of angles, but to allow all other light to pass through the camera window (e.g., light corresponding to an image to be captured) unobscured. In some embodiments, the coating can adjust the light in a known manner, such that software can be used to remove the effect of the coating and light received through the window. Similarly, light passing from a display element through the window can be automatically adjusted based on the properties of the coating on the window such that the display appears in expected colors and size (e.g., without distortion) when the display provides an image through the window.

Instead of or in addition to combining optical treatments for providing an optical effect based on external light reaching the window, the optical treatments can be designed to interact with a back light of the electronic device display. Alternatively, the optical treatments can account for the manner in which light emitted by the backlight reflects among device components within the device housing. In particular, coating stacks of varying opacity can be positioned in a different order based on the origin of the light source (e.g., more opaque layers are positioned farther away from the light source).

In some embodiments, light may leak through edges 230 around the periphery of window 200. This may cause light to scatter, and adversely affect the desired aesthetic appearance of the window. To prevent leaking, noise or other adverse effects, edges 230 can be treated, for example with an ink layer or mask deposited in a manner analogous to the other material layers, stacks or masks.

Figure 3:
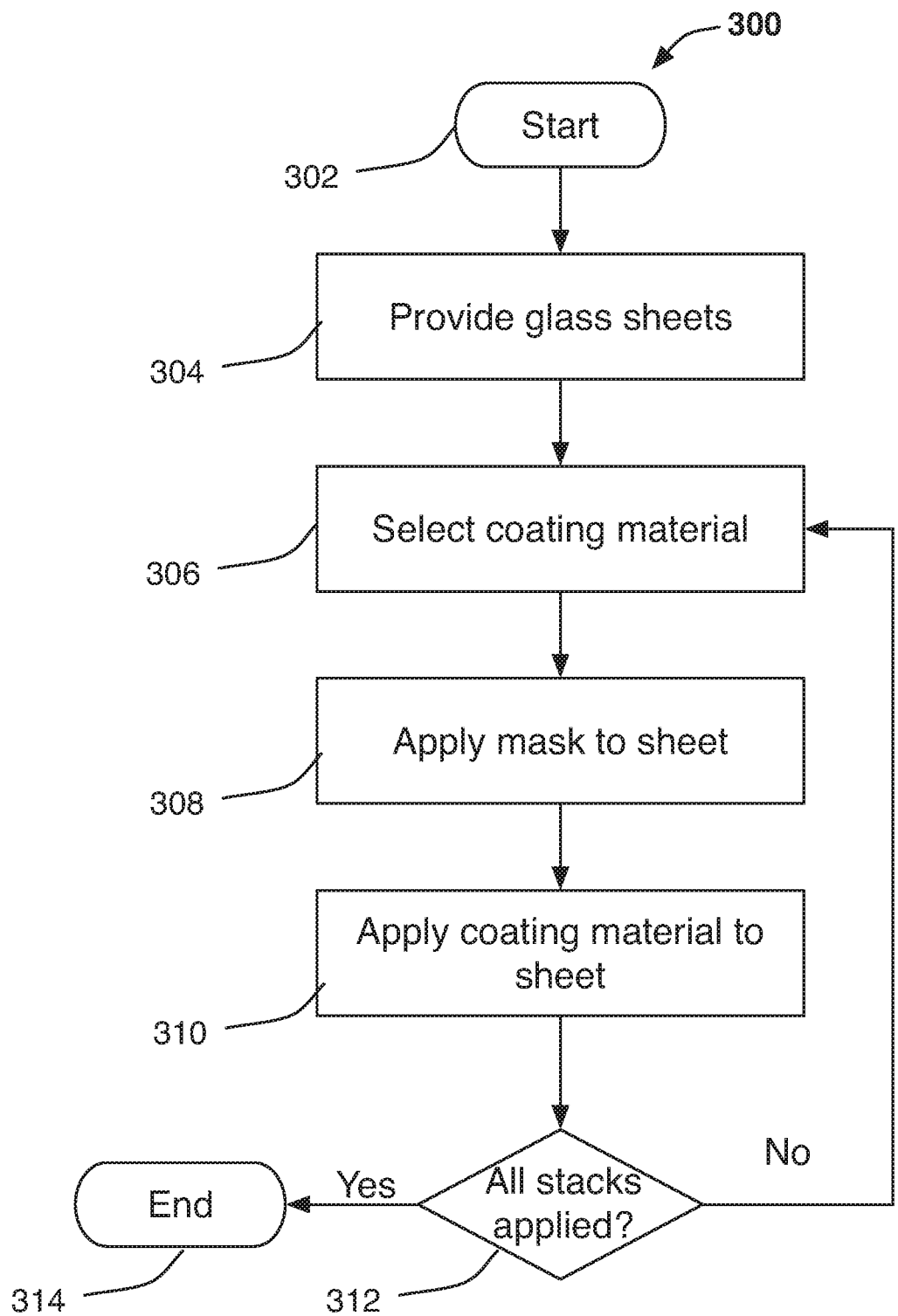
FIG. 3 is a flowchart of an illustrative process for creating an electronic device glass surface having a cosmetic coating in accordance with some embodiments of the invention.

FIG. 3 is a flowchart of an illustrative process for creating an electronic device glass surface having a cosmetic coating in accordance with some embodiments of the invention. Process 300 can begin at step 302. At step 304, one or more glass sheets to be used as an exterior surface of an electronic device can be provided. The glass sheets can be cut or sized for assembly in the device, or can instead be stock sheets that will be cut or finished at a later time for assembly in the devices. The glass sheets can have any suitable shape including, for example, a flat or planar shape or a curved shape (e.g., a curved cross-section for use in a device having a curved housing or bezel). At step 306, a coating material can be selected for a layer of the dichroic stack. The particular material selected can include a metal, a metal oxide, or any other suitable material, and can be selected based on a desired final look or appearance for the glass. For example, the material can be selected such that the glass has particular reflective properties, or such that the glass is in a particular color. In some embodiments, several materials can be selected and combined within a single layer of the dichroic stack. In some cases, one or more additional materials can be used in a layer to provide other types of optical coatings (e.g., layers not part of a dichroic stack) instead of or in addition to the dichroic stack. At step 308, a mask may be selected for the layer. The mask can include any suitable shape including, for example, a logo or watermark associated with the electronic device in which the glass will be assembled. In some cases, no mask may be selected. The particular layer material, as well as the mask can be selected to produce any desired cosmetic effect including, for example, different levels of opacity, adjusted pigmentations, or any other effect. In some embodiments, the material and mask can be selected to achieve a particular color or vibrancy, saturation level, hue, or other optical or cosmetic property.

At step 310, the selected material can be applied to the glass sheet. For example, the selected coating material can be applied to the sheet using a PVD process such that the deposited layer is very thin (e.g., in the range of 20 to 50 nm). Alternatively, any other thin film process can be used. The portions of the material placed on the mask may not bond to the glass but may instead be removed when the mask is removed from the glass. At step 312, the process can determine whether all desired layers of material have been applied to the glass. For example, the process can determine whether all of the desired layers of the dichroic stack have been applied. As another example, the process can determine whether layers associated with other stacks (e.g., an ink stack) have been applied to the glass. If the process determines that additional layers are required for the dichroic stack or for another stack, process 300 can return to step 306 and select another coating material. If, at step 312, the process instead determines that all desired layers of material have been applied, process 300 can move to step 314 and end.

Figure 4:
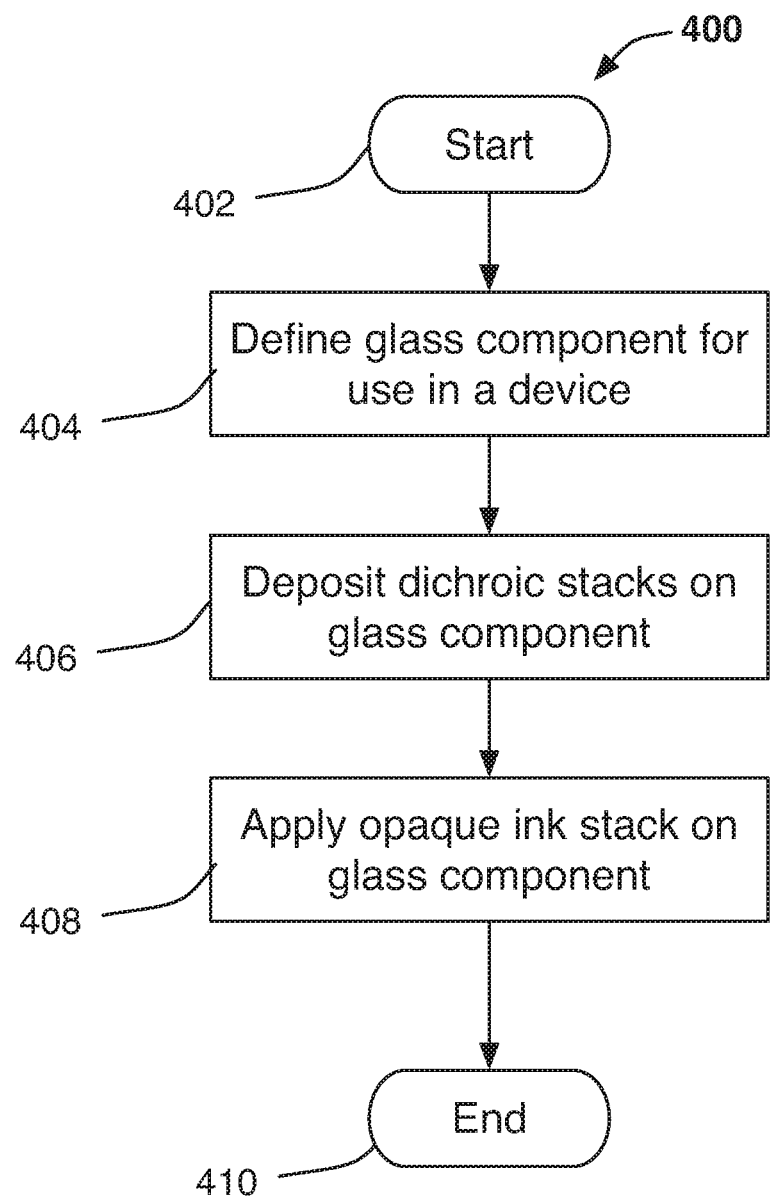
FIG. 4 is a flowchart of an illustrative process for providing a cosmetic dichroic finish on a glass component in accordance with some embodiments of the invention.
Figure 5A:
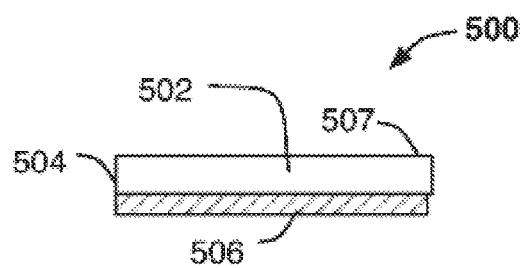
FIGS. 5A-F are cross-sectional views of illustrative glass and coating layers in accordance with some embodiments of the invention.
Figure 5D:
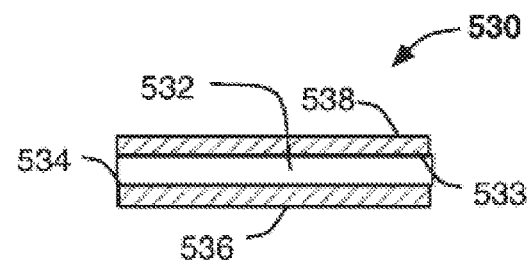
Figure 5B:
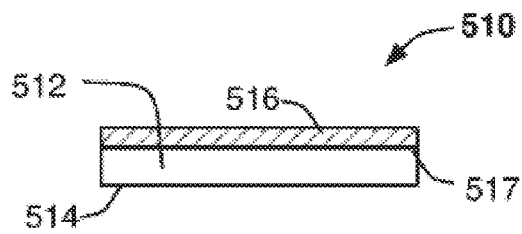
Figure 5E:
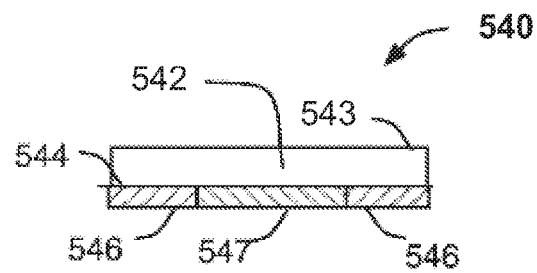
Figure 5C:
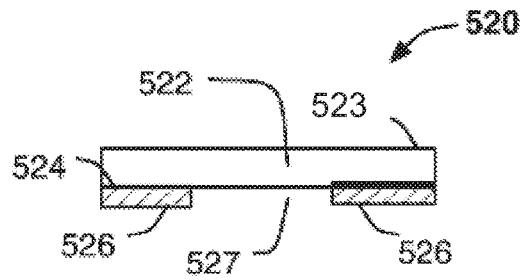
Figure 5F:
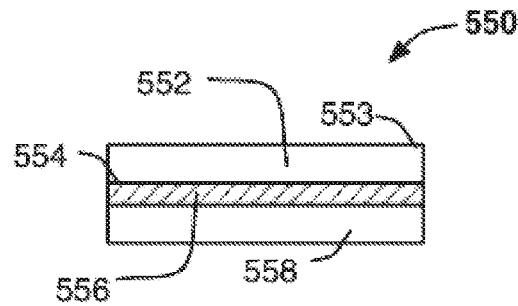

FIG. 4 is a flowchart of an illustrative process for providing a cosmetic dichroic finish on a glass component in accordance with some embodiments of the invention. Process 400 can begin at step 402. At step 404, a glass component for use in an electronic device can be defined. For example, a glass window or cosmetic plate can be defined. At step 406, dichroic layers can be deposited on the glass component. In some cases, the dichroic layer can be deposited in a discontinuous layer, for example having holes or provided as a set of distinct shapes. At step 408, an opaque ink layer can be applied on the glass component, for example on the same or other side of the glass as the dichroic layer. Process 400 can then end at step 410.

Any suitable combination of coatings and masks can be applied to the electronic device glass to provide a particular optical effect. In particular, the glass can include thin film layers of materials not used for dichroic effects, but instead used for other cosmetic purposes. Such materials can include, for example, materials providing a background color of the glass (e.g., inks), materials defining the transparency or opacity of the glass, or materials defining the hue or saturation of the coating colors.

The particular coatings and masks can be applied in any suitable order on any suitable surface of the glass. FIGS. 5A-F are cross-sectional views of illustrative glass and coating layers in accordance with some embodiments of the invention. Window 500 can include glass 502 having top surface 503 and bottom surface 504. Material stack 506 can be applied to bottom surface 504 to provide a desired cosmetic finish. Material stack 506 can be formed from one or more layers of one or more materials including, for example, several layers of different materials having different optical properties. For example, material stack 506 can include one or both of a series of ink layers and a series of dichroic layers. Window 510 can include glass 512 having top surface 513 and bottom surface 514. Material stack 516 can be applied to top surface 513 to provide a desired cosmetic finish, and can include some or all of the features of material stack 506.

Window 520 can include glass 522 having top surface 523 and bottom surface 524. Material stack 526 can be applied to bottom surface 524 to provide a desired cosmetic finish, and can include some or all of the features of material stack 506. Material stack 526 can include one or more gaps or holes 527 caused by a mask placed on the surface of glass 522 when material stack 526 was applied. In some embodiments, material stack 526 can instead or in addition be applied to top surface 523. Window 530 can include glass 532 having top surface 533 and bottom surface 534. Material stack 536 can be applied to bottom surface 534 to provide a desired cosmetic finish, and material stack 538 can be applied to top surface 533. Material stacks 536 and 538 can include some or all of the features of material stack 506. Material stacks 536 and 538 can be constructed from the same or different materials or types of materials, and can have the same or different thicknesses. In some embodiments, each of material stacks 536 and 538 can include different combinations of individual material layers and holes (e.g., created by the application of masks, as shown in window 520) to provide a desired cosmetic appearance.

Window 540 can include glass 542 having top surface 543 and bottom surface 544. Material stacks 546 and 547 can be applied to bottom surface 544 to provide a desired cosmetic finish, and can include some or all of the features of material stack 506. In some cases, material stacks 546 and 547 can be positioned over only a portion of a surface of window 540. In this manner, material stacks 546 and 547 can be positioned adjacent to each other in the plane of the glass window surface (e.g., such that different portions of the same glass window have different dichroic stacks). In some embodiments, material stacks 546 and 547 can instead or in addition be applied to top surface 543. The particular materials or thickness of each of material stacks 546 and 547 can be different to provide a specific cosmetic effect (e.g., a logo or shape visible in window 540).

Window 550 can include glass 552 having top surface 553 and bottom surface 554. Material stack 556 can be applied to bottom surface 554 to provide a desired cosmetic finish, and can include some or all of the features of material stack 506. Window 550 can in addition include second glass 558 coupled to material stack 556 such that material stack 556 is between glass elements 552 and 558. In some embodiments, second glass 558 can instead or in addition include any other transparent or translucent material, such as for example plastic. In some embodiments, window 550 can include other combinations of glass and material layers including, for example, any suitable combination of the window cross-sections described in FIGS. 5A-F.

Figure 6A:
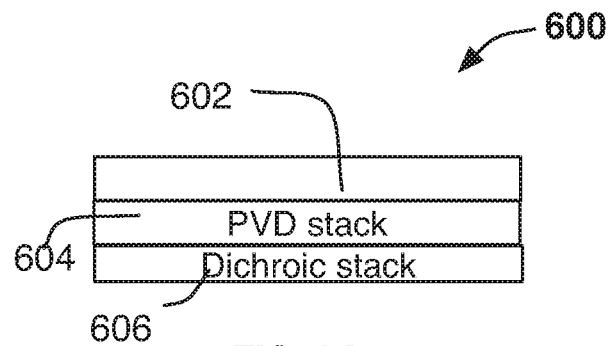
FIGS. 6A-C are cross-sectional views of materials used in illustrative glass coatings in accordance with some embodiments of the invention.
Figure 6B:
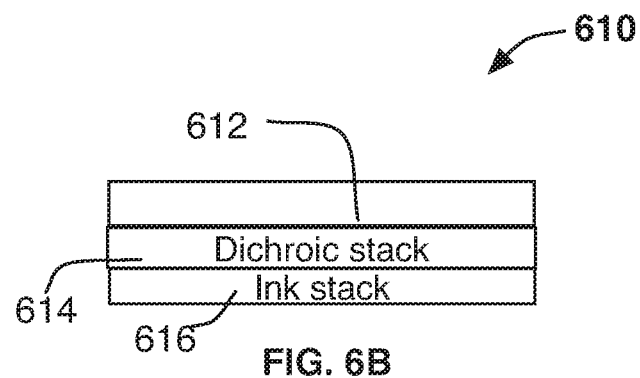
Figure 6C:
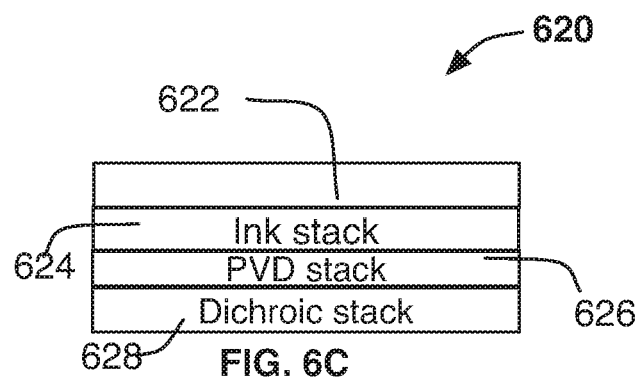
Figure 7A:
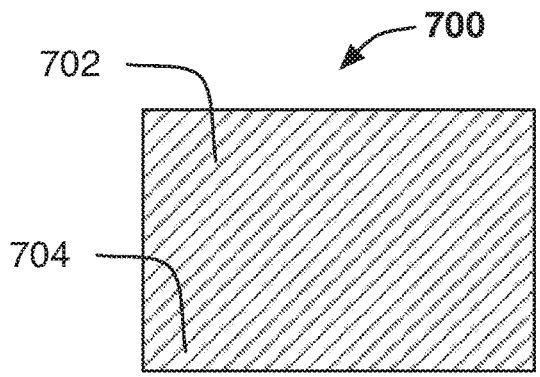
FIGS. 7A-7F are schematic top views of illustrative coatings in accordance with some embodiments of the invention.
Figure 7D:
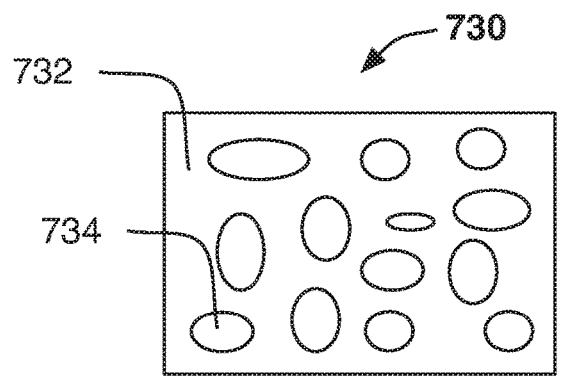
Figure 7B:
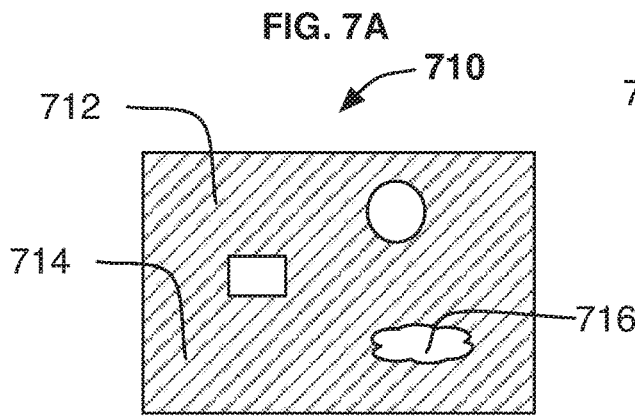
Figure 7E:
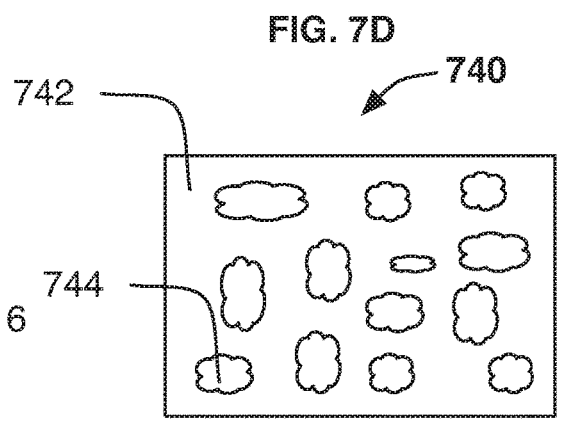
Figure 7C:
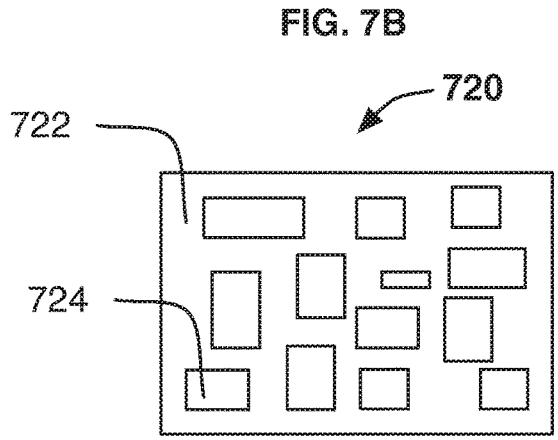
Figure 7F:
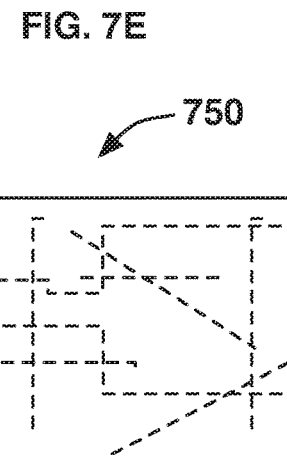

FIGS. 6A-C are cross-sectional views of materials used in illustrative glass coatings in accordance with some embodiments of the invention. Window 600 can include glass 602 to which coating stacks 604 and 606 are applied. Stack 604 can include a PVD stack and stack 606 can include a dichroic stack applied to the bottom side of glass 602, although the stacks can be applied to any side of glass 602 and in any particular order. The particular materials used to create PVD stack 604 and dichroic stack 606, and the size and number of individual layers forming the stacks can be selected based on any suitable desired cosmetic effect.

Window 610 can include glass 612 to which coating stacks 614 and 616 are applied in any particular order. In particular, it may not be necessary that a dichroic stack be a first or last layer applied to the window. Stack 614 can include a dichroic stack and stack 616 can include an ink stack applied to the bottom side of glass 612, although the stacks can be applied to any side of glass 612. The particular materials used to create dichroic stack 614 and ink stack 616 can be selected based on any suitable desired cosmetic effect. Any suitable type of pigmented ink can be used to create ink stack 616 including, for example, a combination of different inks. The ink can be deposited using, for example, screen printing, pad printing, painting, film backing, combinations of these, or any other suitable approach.

Window 620 can include glass 622 to which coating stacks 624, 626 and 628 are applied in any particular order. Stack 624 can include a PVD layer, stack 626 can include an ink layer, and stack 628 can include a PVD layer applied to the bottom side of glass 622, although the layers can be applied to any side of glass 622. The particular materials used to create stacks 624, 626 and 628 can be selected based on any suitable criteria including, for example, a desired optical effect. In some embodiments, any combination of the layers described in FIGS. 6A-C can be used to create an aesthetically pleasing window.

In some embodiments, the coatings can be selected to have a particular color gradient or color variation across the glass. For example, the glass can include one or more colors having different richness or opacity based on the location on the window (e.g., richer colors in the center and more subdued colors on the edges). In some embodiments, a coating can instead or in addition be applied such that the window includes a logo or pattern visible due to a dichroic effect. This can allow a manufacturer to watermark particular products, or to differentiate products in the marketplace. As another example, the coating can be applied on the device component to hide text printed on the device (e.g., text required by government agencies). This approach can allow the text to be seen from some orientations, thus adhering to the governmental regulations, while hiding the text from other orientations, thus improving the aesthetics of the device.

In some embodiments, the coating stacks can be applied only to particular portions of a glass window. For example, one or more coating stacks can be applied as a continuous layer, as a layer having openings or holes, or as several discontinuous elements. FIGS. 7A-7F are schematic top views of illustrative coatings in accordance with some embodiments of the invention. Regions 702, 712, 722, 732, 742 and 752 of surfaces 700, 710, 720, 730, 740, and 750 can be coated with an optic coating (e.g., a dichroic coating) such that the entirety of the region provides a desired optical effect (e.g., there is no opening in the regions through which a display is to be provided).

Region 702 can include coating 704 continuously layered over the region. Coating 704 can include any suitable type of coating including, for example, a dichroic layer or an ink layer. In some embodiments, coating 704 can include several overlapping layers (e.g., one or more dichroic layers over an ink layer). In some cases, however, the intensity of light reflected and transmitted by a continuous dichroic layer can be too intense or too bright. To reduce the intensity of the light while still providing a dichroic effect, one or both of the ink and dichroic layers can be discontinuous.

In the example of region 712, coating 714 can include one or more openings or holes 716 in which no coating is provided. Holes 716 can have any suitable size or distribution within region 712. For example, holes 716 can include one or more square, rectangular, circular, elliptical, polygonal, or arbitrary shapes. The holes can be distributed in a regular, periodic, symmetrical, or repeatable pattern, or alternatively in an arbitrary pattern. The holes can have any suitable size including, for example, a minimum size of 10 microns (e.g., in the range of 30 to 100 microns). For example, the holes can have a diameter or characteristic length of 50 microns. In some embodiments, the hole size can be limited by a masking process used to create the holes. Alternatively, the hole size can be limited by an ablation process. In some embodiments, coating 714 can include only a single hole type or shape (e.g., only square or rectangular holes). The holes can cover any suitable portion of region 712 including, for example, an amount in the range of 5% to 95%. In some embodiments, several coating layers can include different holes that may or may not overlap (e.g., an ink layer and a dichroic layer both include holes).

In the example of region 722, coating 724 can be constructed from several distinct shapes deposited on the region. In the example of region 722, coating 724 can include several square or rectangular shapes having the same or different sizes. For example, the shapes of coating 724 can have sizes (e.g., a diameter or characteristic length) in the range of 20 microns to 100 microns (e.g., 30 or 50 microns). As another example, the sizes of the shapes can be smaller or larger (e.g., based on constraints of the manufacturing process used). The shapes can be distributed in region 722 using any suitable approach including, for example, a regular, periodic, symmetrical, or repeatable pattern, or alternatively in an arbitrary pattern having irregular lines around its periphery (e.g., to avoid a user's eyes detecting a pattern). The shapes can cover any suitable portion of region 722 including, for example, an amount in the range of 5% to 95% (e.g., an amount in the range of 50% to 75%). In effect, the coating can be applied as a half-tone to the region. In some embodiments, several coating layers can include different shapes that may or may not overlap (e.g., an ink layer and a dichroic layer both include shapes).

In the examples of regions 732 and 742, coatings 734 and 744 can include some or all of the features of coating 724, described above. In contrast with coating 724, however, the shapes of coating 732 can include circular or elliptical shapes, while the shapes of coating 744 can include arbitrary shapes. In some embodiments, a coating can include a combination of the shapes of two or more of coatings 724, 734 and 744 (e.g., a coating with rectangular and arbitrary shapes). In particular, using different shapes, and non-repeated shapes (e.g., arbitrary shapes) can enhance the optical effect by limiting a user's ability to see shapes or patterns in the coating.

In the example of region 752, coating 754 can be constructed from several lines. The lines can be parallel, perpendicular, or at arbitrary angles relative to one another. In some embodiments, the lines can be curved or angled, such that a single line includes several segments aligned in different directions. The lines can have any suitable thickness including, for example, a thickness smaller than 10 microns (e.g., unlike some shapes). To ensure that the lines remain adhered to region 752 when applied using a mask, the line length can be selected such that the surface area of each line exceeds at least a minimum surface area (e.g., a surface area equivalent to a shape having a diameter of 20 microns). In some embodiments, one or more lines can be combined with one or more shapes to form a dichroic or ink coating.

In some embodiments, the distribution or size of the holes, shapes or lines on a surface can vary in density (e.g., fade). For example, the density of the coating can vary from a first amount in one region of the surface to a second amount in another region of the surface (e.g., 50% shape density at the top of the region, and 75% shape density at the bottom of the region). The density of the coating can vary between any suitable amount, including amounts in the range of 5% to 95%. In some embodiments, the density can vary based on a curve or distribution. For example, the density can vary following a pattern corresponding to a logo or text.

Figure 8:
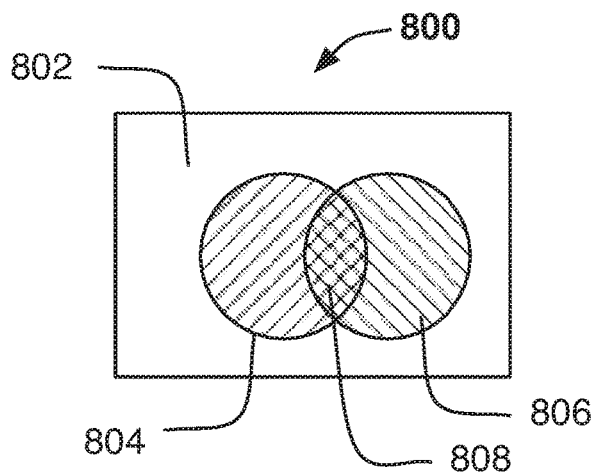
FIG. 8 is a schematic top view of an illustrative surface on which several coatings are provided to form a logo in accordance with some embodiments of the invention.

As described above, the coatings applied to a surface can be used to form a logo, watermark, or text on the device surface. In some embodiments, different layers of the dichroic coating, ink coating, or both can combine to form features of the logo. In particular, different shapes of each layer of a coating can combine to provide light reflecting or transmitting in different colors as part of the logo. FIG. 8 is a schematic top view of an illustrative surface on which several coatings are provided to form a logo in accordance with some embodiments of the invention. Surface 800 can include region 802 on which a coating can be applied. In some embodiments, the coating can be applied as a series of half-tones or shapes. In particular, region 802 can include shape 804 having a first set of properties (e.g., a first dichroic layer), and shape 806 having a second set of properties (e.g., an ink layer or a second dichroic layer). Each shape can affect light in a different manner including, for example, by changing the color in which the light is reflected or transmitted by each shape. The shapes can intersect in area 808, such that light reflected or transmitted by area 808 is different than the light reflected or transmitted by one of shapes 804 and 806. By combining a series of shapes 804 and 806 (and other shapes of ink or dichroic coatings in any suitable number of layers), a multi-color logo can be defined.

Any suitable approach can be used to restrict a coating to only some portions of a surface (e.g., only as shapes, or as a layer with holes). In some embodiments, undesired portions of a coating can be removed using an ablation process (e.g., laser ablation). In some embodiments, a mask can instead or in addition be placed over the surface, and the coating can be selectively applied over the mask (e.g., using a PVD process) to define shapes or holes in the coating. In traditional masking techniques, a shield (e.g., a metal fixture) or a plastic film is applied over a surface, and a coating is applied over the surface and shield. With ink and dichroic coatings, however, each material layer can be so thick (e.g., in the range of 10 nm) that the thickness of the mask can prevent the coating from reaching the edge of the mask.

Figure 9A:
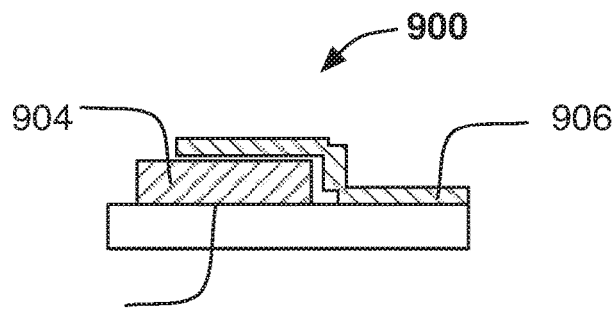
FIG. 9A is a cross-sectional view of an illustrative shield applied to a surface to mask the surface in accordance with some embodiments of the invention.

FIG. 9A is a cross-sectional view of an illustrative shield applied to a surface to mask the surface in accordance with some embodiments of the invention. Component 900 can include surface 902 on which a coating is to be applied. To limit the region of the coating, mask 904 can be applied to cover a portion of surface 902. Coating 906 can be deposited over mask 904 and surface 902 using any suitable process including, for example, a vapor deposition. Coating 906 can have any suitable thickness including, for example, a thickness that is substantially smaller than the thickness of mask 904 (e.g., 10 to 1000 times smaller).

Figure 9B:
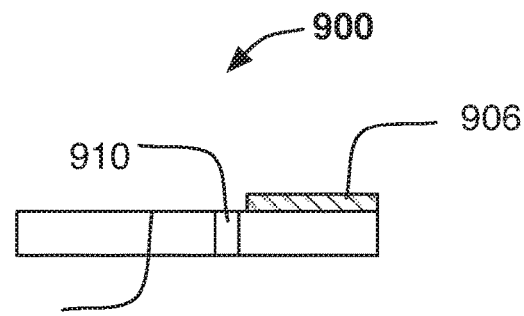
FIG. 9B is a cross-sectional view of the surface of FIG. 9A once the mask is removed in accordance with some embodiments of the invention.

Referring now to FIG. 9B, which shows a cross-sectional view of the surface of FIG. 9A once the mask is removed in accordance with some embodiments of the invention, surface 902 can include the portion of coating 906 that was not deposited on mask 904. Because of the thickness of mask 904, however, the mask may create a shadow and cause coating 906 to be partially or not at all deposited in region 910 adjacent to the mask. This can cause coating 906 to have a rough or sharp edge, instead of the straight edge that could be expected as a result of using mask 904.

It may be necessary, therefore, to use a mask that has a comparable thickness with the thickness of the coating. In some embodiments, the mask can be formed using a photolithography process or a screen-printing process. For example a liquid (e.g., a organic liquid) can be deposited through a screen on the display. In one implementation, the liquid can include a carrier liquid used for depositing pigments on a surface in a photolithography process. Because the liquid may not include the larger pigment molecules, a smaller and more precise screen can be used to form the mask. Once the mask has been applied, the coating can be deposited over the mask. The mask can later be removed by dissolving the liquid mask. Using a liquid mask can also have other advantages. In particular, the liquid mask can have a meniscus causing the mask to taper along the edge of the mask, thus providing a very thin boundary for the coating (e.g., the mask height can be no more than 50 microns). Furthermore, because the liquid adheres directly to the surface, there is no need for an adhesive or other element between the mask and the component, thus further increasing the height of the mask.

Figure 10A:
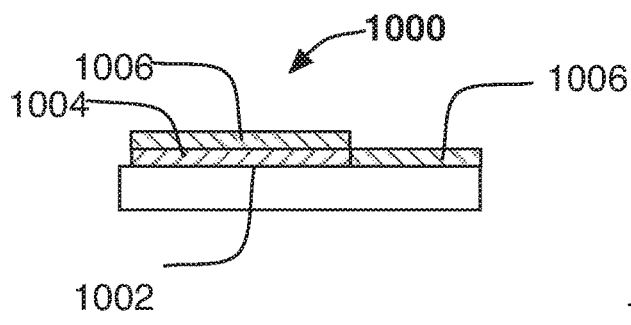
FIGS. 10A and 10B are cross-sectional views of a device component on which a mask is applied using a photolithography process in accordance with some embodiments of the invention.
Figure 10B:
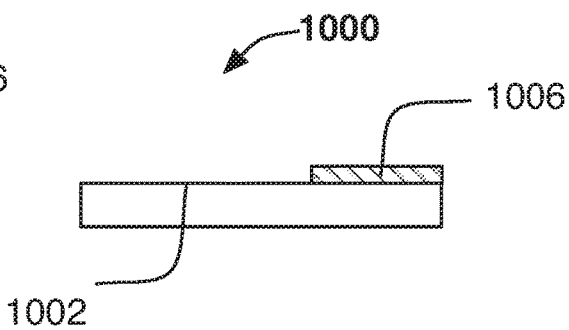

FIGS. 10A and 10B are cross-sectional views of a device component on which a mask is applied using a photolithography process in accordance with some embodiments of the invention. Mask 1002 can be applied to component 1000 to hide portions of the component. Once mask 1002 has been applied, coating 1010 can be applied over mask 1002 and component 1000, for example using a vapor deposition process. To provide coating 1010 only on non-masked portions of component 1000, mask 1002 can be removed to leave coating 1010 extending to the edges of mask 1002. In some embodiments, mask 1002 can be constructed from a water-soluble ink, such that a water-based solution can dissolve the mask and remove excess coating.

Figure 11:
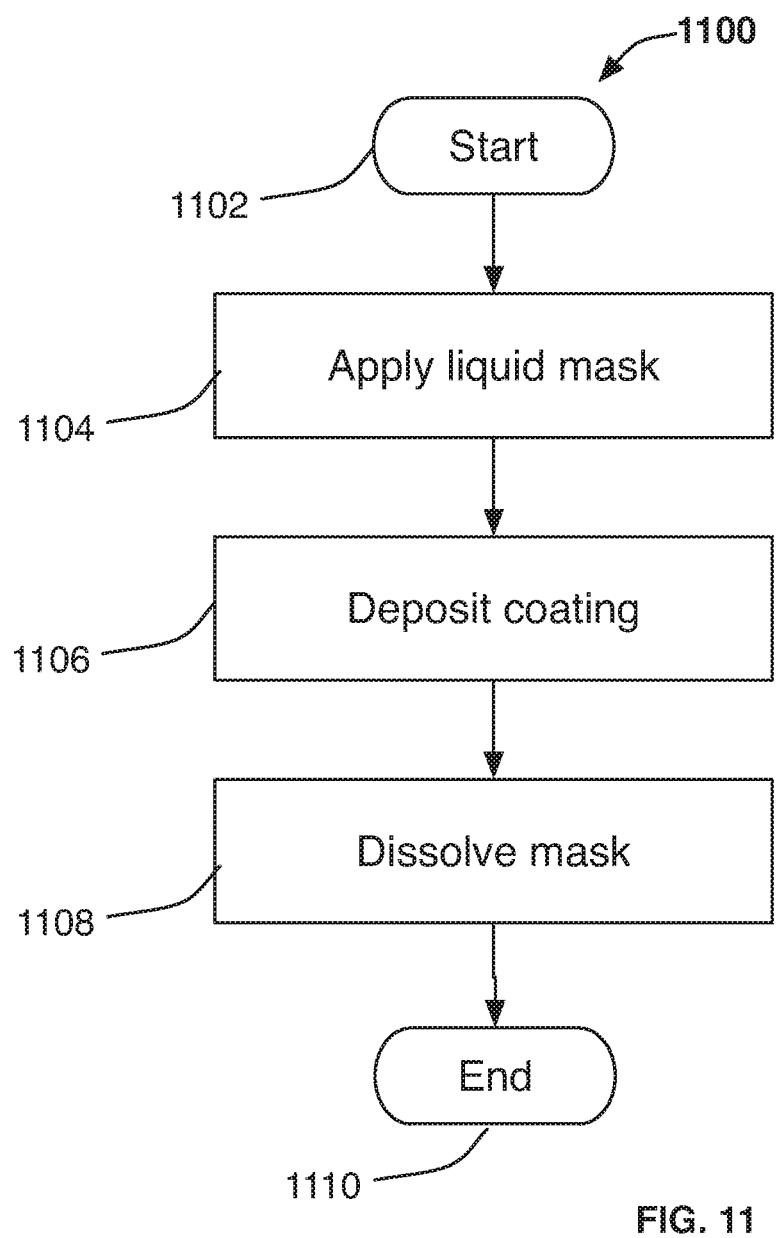
FIG. 11 is a flowchart of an illustrative process for applying a photolithography mask in accordance with some embodiments of the invention.

FIG. 11 is a flowchart of an illustrative process for applying a photolithography mask in accordance with some embodiments of the invention. Process 1100 can begin at step 1102. At step 1104, a liquid mask can be applied. For example, a liquid mask can be applied using one of a silk screen and a photolithography process. At step 1106, a coating can be applied to the component and mask. For example, a PVD process can be used to deposit thin layers of material on the component. At step 1108, the mask can be removed. For example, the mask can be dissolved using a wash process (e.g., use an ultrasonic bath). Process 1100 can then end at step 1110.

Other processes can be used instead of or in addition to photolithography and screen-printing for forming a mask. In some embodiments, a laser curing process can be used. For example, ink or another mask material can be applied to a component surface. Using a laser or other device, the ink can be cured in the regions of the surface that are to be masked (e.g., around the periphery of shapes, or in a window of the surface). The non-cured ink can then be removed from the surface of the electronic device. When a dichroic material is applied to the surface, the portions of the dichroic material deposited on the ink layer can be later removed by dissolving the ink. This approach can, in some cases be more dynamic than photolithography or screen printing, as a laser can be quickly re-programmed to cure different regions of the surface, while a photolithography or screen printing process can require a new screen to be designed and manufactured.

In some embodiments, a mask can be applied and removed between layers or stacks of coated material. For example, an ink layer can first be applied in some regions using a mask. The boundaries of the ink layer can then be adjusted or modified, for example using an ablation process (e.g., a laser ablation process). Once the boundaries have been refined, additional layers (e.g., of dichroic material) can be placed over the initial layers using a new mask. This approach can ensure that the additional layers (e.g., the dichroic layer) are properly aligned with the ink layer.

Figure 12:
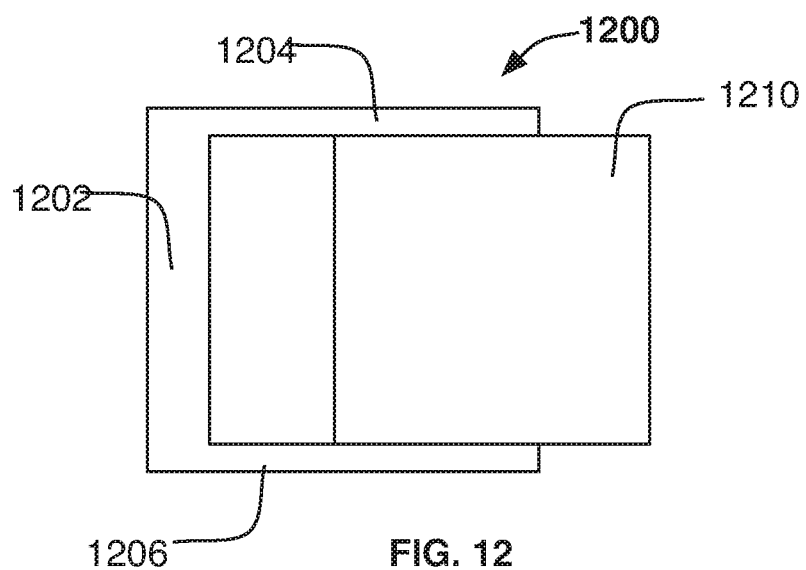
FIG. 12 is a schematic view of an illustrative fixture for applying a coating to the border of a component surface in accordance with some embodiments of the invention.

In some embodiments, one or more coatings or layers can be applied up to an edge of the component or of a region of the component. For example, one or more coatings can be applied up to an internal window of the component. As another example, one or more coatings can be applied to an outer most edge of the component. In some cases, one or more coatings can be applied on a component, and the component can later be cut to define the external boundaries of the component, where the external boundaries will be within the area of the component that was cut. Some components, however, can be treated (e.g., chemically) to harden or strengthen the component (e.g., to harden glass). Cutting the component can release the stresses that harden the component, and remove the hardening treatment. It may be necessary, therefore, to provide a fixture that allows the coating to be applied to the edges or border of the component surface. For example, FIG. 12 shows an illustrative fixture for applying a coating to the border of a component surface in accordance with some embodiments of the invention. Fixture 1200 can include base 1202 and fingers 1204 and 1206 extending from base 1202 and operative to secure component 1210. Fingers 1204 and 1206 can secure the edges of the glass using any suitable approach including, for example, a mechanical tightening, an adhesive, tape, a press fit, or combinations of these.

Base 1202 and fingers 1204 and 1206 can have any suitable height including, for example, a height that is less than the height of component 1210. As another example, base 1202 and fingers 1204 and 1206 can be positioned such that they are flush or underneath the surface of component 1210. This can prevent the fixture from creating a shadow preventing the coating from reaching the border of the component (e.g., similar to the issue with traditional shields serving as masks). In some embodiments, fixture 1200 can include one more The materials and layer configuration used to generate a dichroic stack can be selected using any suitable approach. In some embodiments, modeling software can be used predict how light will reflect and transmit through a particular defined dichroic stack. Alternatively, a particular resulting visual effect can be selected. For example, a user can define a particular color power curve or profile defining the desired color profile for light transmitted or reflected by the dichroic stack. In some embodiments, a user can define one or more color power curves for viewing the stack at different angles (e.g., such that the glass window appears in different colors to a user based on the angle of the user relative to the glass window.

Figure 13:
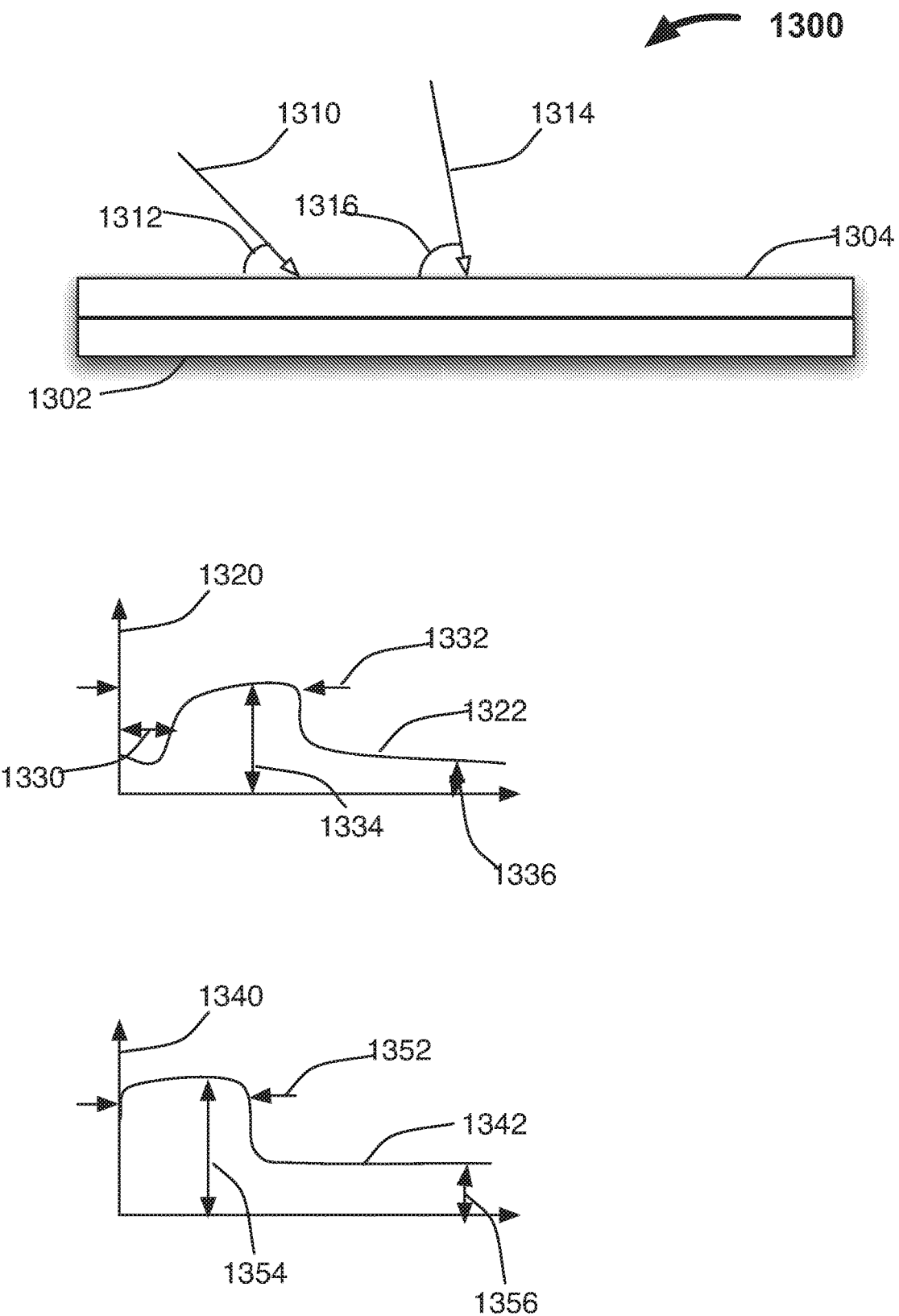
FIG. 13 is a schematic view of an illustrative glass surface for which different color power curves are visible from different incident angles in accordance with some embodiments of the invention.

FIG. 13 is a schematic view of an illustrative window for which different color power curves are visible from different incident angles in accordance with some embodiments of the invention. System 1300 can include glass 1302 on which stack 1304 of distinct dichroic layers are deposited. As light reaches stack 1304 from different angles, the resulting transmitted or reflected light can have a particular color power profile. For example, light 1310 reaching stack 1304 at angle 1312 can be associated with color power profile 1322, and light 1314 reaching stack 1304 at angle 1316 can be associated with color power profile 1342. Color power profile 1322 can include a curve along axes 1320, in which axes 1320 can include an axis defining the intensity of the light and an axis defining the wavelength for the light. Color power profile 1322 can be characterized by one or more characteristic measurements including, for example, by offsets 1330 and 1332 defining the wavelength range of a peak, and wave heights 1334 and 1336 defining the heights of a peak and of a tail. Similarly, color power profile 1342 can be characterized by one or more characteristic measurements including, for example, by offset 1352 defining the wavelength range of a peak, and wave heights 1354 and 1356 defining the heights of a peak and of a tail.

A user can provide curves 1322 and 1342, along with the corresponding angles 1312 and 1316, respectively, to appropriate software. The curves can correspond to any suitable transmitted or reflected light including, for example, light transmitted or reflected from particular angles (e.g., provide curves corresponding to transmitted and reflected light at a given angle). The software can simulate a multitude of different dichroic stack configurations involving different types of materials, different layer thicknesses, and different numbers of layers, or different layer shapes or sizes. Following the simulations, the software can provide one or more optimal dichroic stack configurations for the user to manufacture and test. For example, the software can suggest a dichroic stack having 20 to 130 layers of SiO2 and TiO2. One or more glass windows to which layers are applied using the optimal dichroic stack configuration can be constructed and reviewed. Based on the appearance of the glass window, the curves (e.g., curves 1322 and 1342) can be adjusted (e.g., raise the tail end of the curve to let more light through) and the process repeated to perfect the glass window appearance.

Figure 14:
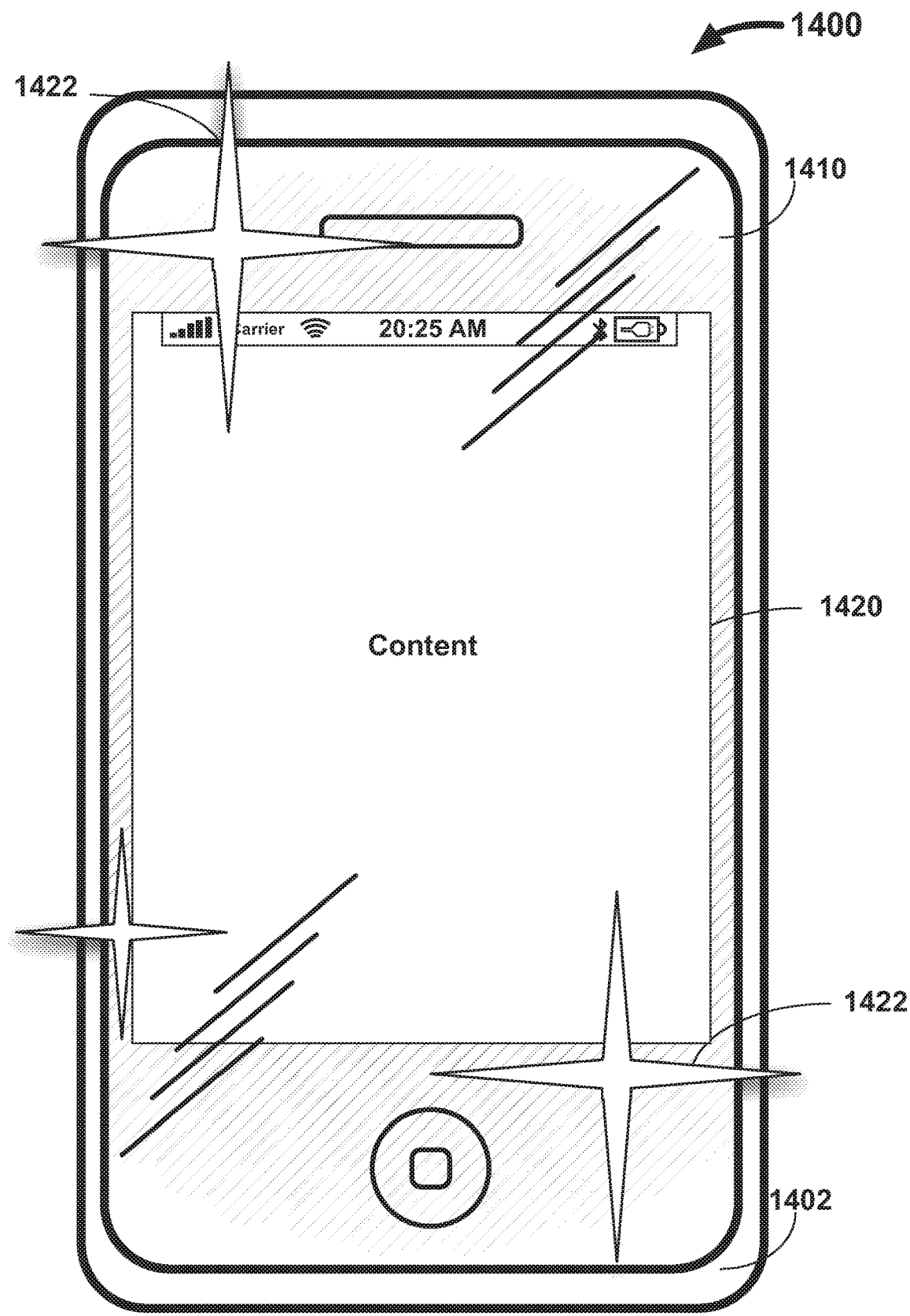
FIG. 14 is a schematic view of an illustrative device to which a cosmetic optical coating is applied in accordance with some embodiments of the invention.

FIG. 14 is a schematic view of an illustrative device to which a cosmetic optical coating is applied in accordance with some embodiments of the invention. Electronic device 1400 can include housing component 1402 and window 1410. Window 1410 can be treated using one or more coatings to create an optical effect in line with the cosmetic finish of housing component 1402. In particular, as shown in FIG. 14, cosmetic effect 1420 extends across window 1410 and into housing component 1402. In addition, the cosmetic effect can include one or more areas 1422 for accentuating a particular cosmetic effect. Areas 1422 can include any suitable optical properties or cosmetic effects. For example, areas 1422 can have any suitable transmittance or reflectance to provide a particular cosmetic effect. In particular, each area 1422 can be defined such that the light transmitted and the light reflected in area 1422 have particular profiles that can combine for a desirable cosmetic effect (e.g., the areas are associated with particular reflected and transmitted color power profiles). In some embodiments, each of areas 1422 can generate different cosmetic effects, for example based on the light source used to view the window 1410.

Figure 15:
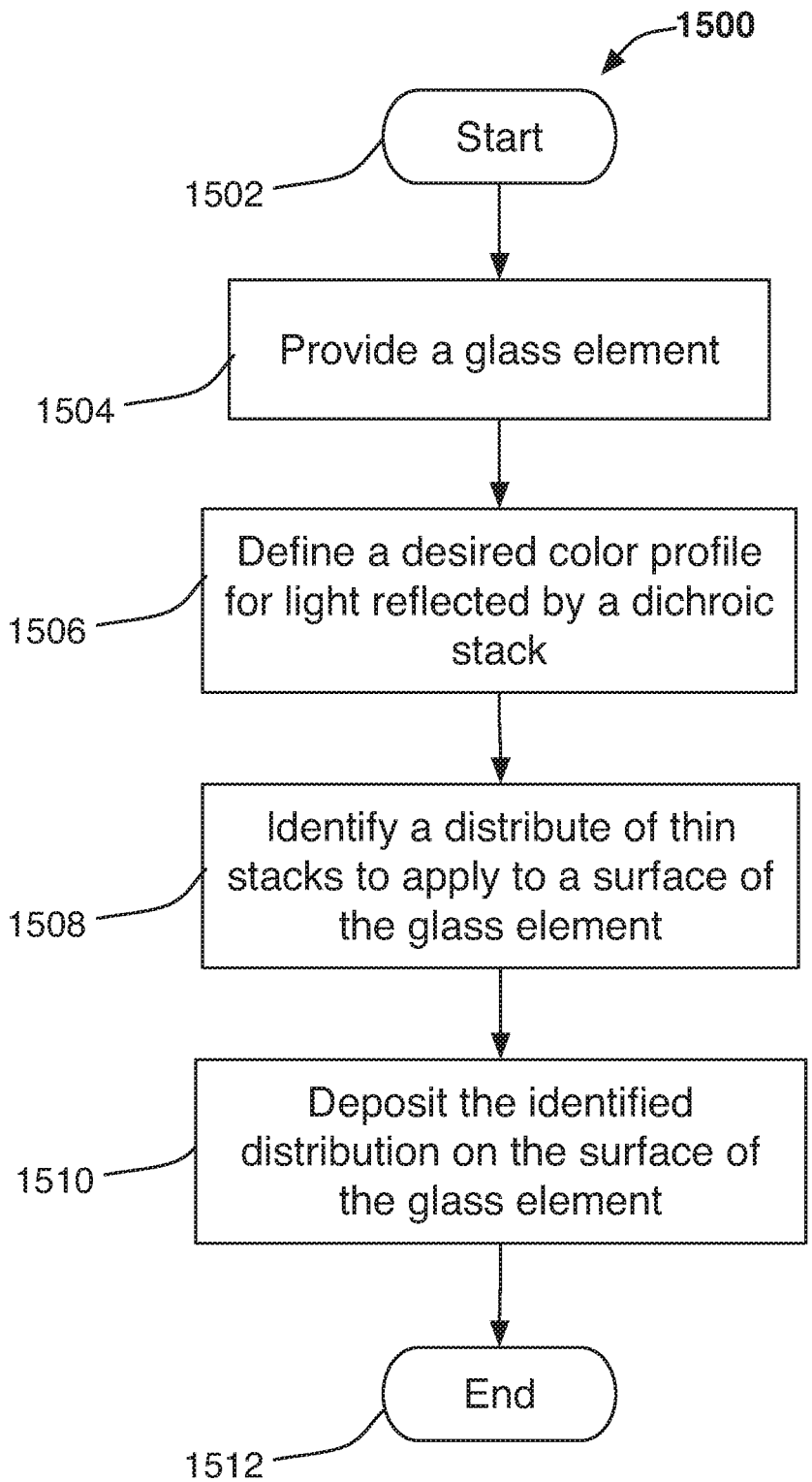
FIG. 15 is a flowchart of an illustrative process for creating a glass element having a cosmetic dichroic treatment in accordance with some embodiments of the invention.

FIG. 15 is a flowchart of an illustrative process for creating a glass element having a cosmetic dichroic treatment in accordance with some embodiments of the invention. Process 1500 can begin at step 1502. At step 1504, a glass element can be provided. For example, a window of an electronic device can be provided. At step 1506, a desired color profile for light reflected by a dichroic stack can be defined. The color profile can be defined for light originating from a specific orientation relative to the dichroic stack. At step 1508, a distribution of thin layers of different materials to apply to a surface of the glass element to form a dichroic stack can be identified. For example, a distribution can be selected such that light reflected by the dichroic stack corresponds to the desired color profile. At step 1510, the identified distribution of thin layers on the surface of the glass element can be deposited. In some cases, the distribution can include several holes. Process 1500 can then end at step 1512.

The previously described embodiments are presented for purposes of illustration and not of limitation. It is understood that one or more features of an embodiment can be combined with one or more features of another embodiment to provide systems and/or methods without deviating from the spirit and scope of the invention. The present invention is limited only by the claims which follow.

What is claimed is:

1. A glass window for use in an electronic device, comprising:
    a glass plate comprising a first planar surface and second planar surface, the first planar surface opposite from the second planar surface;
    an opaque layer applied to a first region of the first planar surface of the glass plate;
    a discontinuous dichroic layer deposited on a second region of the first planar surface and the opaque layer, a portion of the discontinuous dichroic layer deposited on the second region:
        comprising a stack of at least partially overlapping layers, the stack of at least partially overlapping layers including at least one of a metal layer or a metal oxide layer;
        defining a color gradient that extends along the second region of the first planar surface; and
        defining a first surface facing the first planar surface of the glass plate and a second surface opposite the first surface; and
    an opaque ink layer applied to the second surface of the discontinuous dichroic layer.

2. The glass window of claim 1, wherein the stack of at least partially overlapping layers includes the metal layer.

3. The glass window of claim 2, wherein a number of the at least partially overlapping layers ranges from 10 to 70.

4. The glass window of claim 1, wherein the stack of at least partially overlapping layers includes layers that partially overlap.

5. The glass window of claim 1, wherein the color gradient includes a color profile for light reflected by the discontinuous dichroic layer.

6. The glass window of claim 5, wherein:
    the opaque ink layer is a colored ink layer;
    the light reflected by the discontinuous dichroic layer is a first portion of light incident on the discontinuous dichroic layer; and
    the discontinuous dichroic layer in combination with the colored ink layer absorbs a second portion of the light incident on the discontinuous dichroic layer, while the color profile remains visible.

7. A method for providing a cosmetic dichroic finish on a glass component, comprising:
    depositing an opaque layer on a first region of a planar surface of the glass component;
    depositing a discontinuous dichroic layer defining a color gradient on a second region of the planar surface of the glass component and on the opaque layer, the discontinuous dichroic layer comprising a stack of partially overlapping layers having a thickness in a range of 20 nm to 50 nm and each layer in the stack of partially overlapping layers comprising at least one of a metal or a metal oxide; and
    depositing an opaque ink layer on the discontinuous dichroic layer.

8. The method of claim 7, wherein the method further comprises:
    defining a color profile for the color gradient for light reflected by the discontinuous dichroic layer;
    identifying a distribution of the partially overlapping layers to apply to the second region of the planar surface of the glass component and on the opaque layer to form the discontinuous dichroic layer such that the light reflected by the discontinuous dichroic layer corresponds to the color profile; and
    the opaque ink layer comprises at least one colored ink layer, such that the discontinuous dichroic layer and the at least one colored ink layer combine to absorb a portion of light incident on the discontinuous dichroic layer, while the color profile remains visible.

9. The method of claim 7, wherein the method further comprises:
    applying a mask on a portion of the planar surface of the glass component;
    depositing the stack of partially overlapping layers on the mask; and
    removing the mask to create a plurality of holes.

10. The method of claim 7, wherein:
    the layers of the stack of partially overlapping layers comprise metals and metal oxides;
    the metals include gold and silver; and
    the metal oxides include oxides of titanium, chromium, aluminum, zirconium, or magnesium.

11. The method of claim 10, wherein the stack of partially overlapping layers is deposited by a physical vapor deposition process.

12. The method of claim 7, wherein a number of partially overlapping layers deposited on the second region is in a range of 10 layers to 70 layers.

13. The method of claim 7, wherein:
    the planar surface is a first planar surface;
    the glass component further defines a second planar surface opposite the first planar surface;
    the opaque ink layer is a first opaque ink layer; and
    the method further comprises depositing a second opaque ink layer on a region of the second planar surface.

14. An optical component for use in an electronic device, comprising:
    a glass element defining a planar surface;
    an opaque layer deposited on a first region of the planar surface of the glass element;
    a discontinuous dichroic layer defining a color gradient and comprising a stack of partially overlapping layers, each layer comprising at least one of metal or metal oxide and the stack of partially overlapping layers having a thickness in a range of 20 nm to 50 nm, the discontinuous dichroic layer deposited on a second region of the planar surface of the glass element and on the opaque layer; and
    an opaque ink layer deposited on the discontinuous dichroic layer.

15. The optical component of claim 14, wherein:
    the planar surface is a first planar surface;
    the opaque ink layer is a first opaque ink layer;
    the glass element further defines a second planar surface opposite the first planar surface; and the optical component further comprises a second opaque ink layer on a region of the second planar surface.

16. The optical component of claim 15, wherein the region of the second planar surface includes a periphery of the second planar surface at least partially surrounding a central region.

17. The optical component of claim 14, wherein the color gradient includes light reflected from the discontinuous dichroic layer and having a color profile.

18. The optical component of claim 17, wherein the stack of partially overlapping layers is configured to produce the light having the color profile.

19. The optical component of claim 14, wherein the layers of the stack of partially overlapping layers comprise at least one of gold, silver, titanium oxide, chromium oxide, aluminum oxide, zirconium oxide, or magnesium oxide.

20. The glass window of claim 1, wherein the opaque ink layer includes at least one of a black ink layer or a white ink layer.

* * * * *